Feb. 16, 1943.                A. HANSEN, JR                    2,311,382
                             MAGNETIC SUSPENSION
                             Filed Oct. 4, 1940
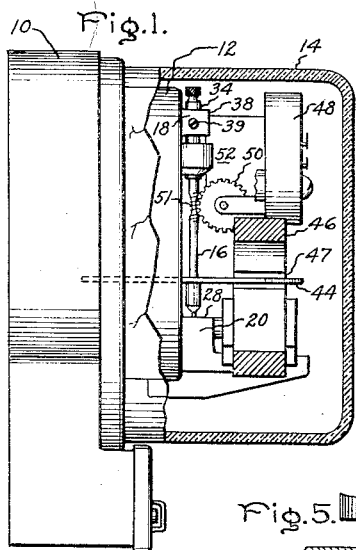
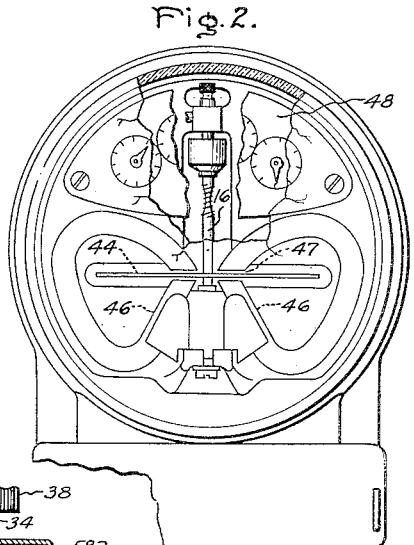
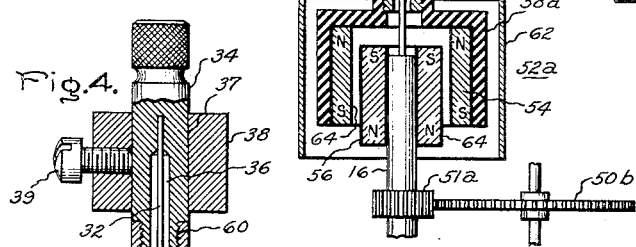
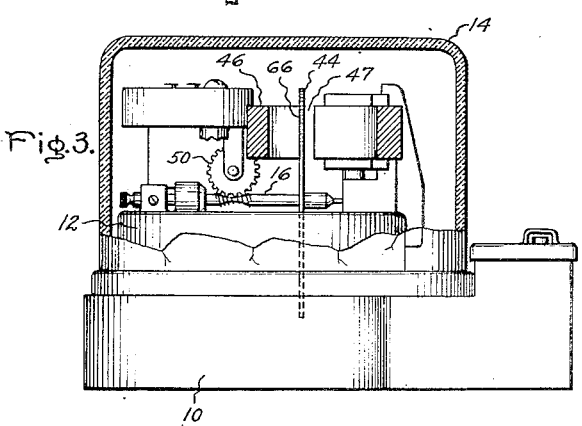
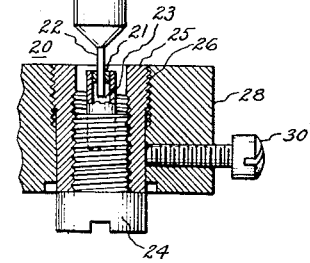
Inventor:
Albert Hansen Jr.,
by Harry E. Dunham
His Attorney.

Patented Feb. 16, 1943

2,311,382

UNITED STATES PATENT OFFICE 2,311,382

MAGNETIC SUSPENSION

Albert Hansen, Jr., Nahant, Mass., assignor to General Electric Company, a corporation of New York Application October 4, 1940, Serial No. 359,732

7 Claims. (Cl. 308—1)

This invention relates to a magnetic suspension for supporting the weight of a rotatable element and, though having other and broader fields of application, the invention is particularly useful for magnetically suspending the movable element of electrical measuring devices such, for example, as watthour meters and it will be described as applied for such use.

In connection with the operation of many measuring instruments such, for example, as integrating watt-meters, it is highly important that all causes of inaccuracy be reduced to as low a value as possible. In meters of this character, where a shaft is rotated, friction enters in causing a retarding torque and some means should be used for reducing it to a minimum. In the conventional watthour meter the end thrust bearing at the bottom of the movable spindle which supports the weight is usually a sapphire jewel which is subject to being broken or roughened in a short time by the action of the spindle point. This roughening results primarily in causing the meter to have a different operating characteristic with the result that it runs slow on some loads and particularly so when the meter is operating at low loads. When this condition is present it means that the central station may be supplying energy at a momentary loss in view of the fact that a large portion of the meters are in service several hours per day on the low load end of their characteristics. It is accordingly an object of my invention to provide a new and improved magnetic suspension for supporting or floating entirely the weight of the movable element in a measuring instrument such as a watthour meter.

It is another object of my invention to provide an improved magnetic suspension for floatingly supporting rotary elements which is magnetically stable in the vertical direction and which enables me to take advantage of the highly desirable qualities of permanent magnets composed of certain high coercive force magnetic materials.

It is still another object of my invention to provide a simple and improved magnetic suspension means for supporting the weight of the movable element of a watthour meter which reduces to a minimum the mechanical friction acting on the movable element by holding it entirely in suspension or floating relation with respect to vertical forces, which is of rugged construction and which is capable of withstanding the effects of demagnetizing surges acting on the operating element of the meter.

It is a further object of my invention to provide a magnetic suspension employing permanent magnets of novel construction and arrangement in which the rotation or movement of the movable element is substantially unaffected by extraneous torques due to hysteresis and eddy currents.

It is a still further object of my invention to provide a magnetic suspension of novel structural arrangement which is stable magnetically in the vertical plane and in which the permanent magnet elements are utilized in the most effective manner to support the movable element in floating relation by magnetic forces.

It is another object of my invention to provide an electrical integrating meter with my improved magnetic suspension in order greatly to reduce the noise factor incident to the operation of the meter.

Other objects and advantages of my invention will become apparent as the description proceeds.

I shall describe the magnetic suspension which is constructed according to my invention as applied to supporting the weight of the rotatable element of an induction type watthour meter. According to the preferred form of the apparatus which I have provided to illustrate the principles of my invention, I employ a pair of longitudinally polarized cylindrical permanent magnet members of high coercive force material which are disposed in axial symmetry with one magnet surrounding the other or in concentric relation thereto with the axes of the cylindrical members positioned vertically and in axial alignment with the rotary element, and further arranged so that they exert a magnetic force of attraction at each end on each other tending to draw their adjacent end portions into the same horizontal plane. One of the magnets is secured to the frame of the meter and the other magnet is fixed to the movable shaft or rotary element to be supported and inside the fixed magnet. With this arrangement the movable magnet floats freely within the fixed magnet and the entire weight of the rotary element is suspended and made entirely free from any restraining torque due to friction caused by the vertical component of the load. Suitable guide bearing means positioned at the upper and lower end of the shaft maintains the movable or rotatable element free from lateral displacement. A centralizing force is also produced by the magnets, which force increases as the loading is increased.

The features of my invention which I believe to be novel and patentable will be pointed out in the appended claims. The invention may be better understood by reference to the following description when considered in connection with the accompanying drawing in which Figs. 1 and 2 represent assembled views in elevation of the side and front respectively of an induction type integrating watt-meter with a portion of the cover cut away to show the relative arrangement of the parts; Fig. 3 is a view of the meter illustrated in Figs. 1 and 2 in which the base is shown positioned in a horizontal plane to show the position assumed by the rotatable element during shipment; Fig. 4 is a detailed sectional elevational view of the magnetic suspension system arranged in accordance with my invention and drawn to an enlarged scale to show more clearly the various parts; and Fig. 5 is a modification of the embodiment illustrated in Fig. 4.

While I have illustrated my invention in connection with the suspension of the rotary element of an induction type alternating current watthour meter, I wish to point out that it also may be employed to support other types of rotary elements. The meter includes the usual base 10, a frame 12 which is secured to the base, and a cover element 14 for enclosing the operating parts of the meter. The meter also includes a vertical operating shaft 16 which is preferably composed of a suitable material of relatively light weight—as for instance, aluminum, and mounted for rotation in a vertical plane by a plurality of guide means 18 and 20 positioned at the upper and lower ends of the shaft and of a suitable construction to produce a minimum friction on the moving or rotary element 16. The lower bearing assembly or guide means 20 comprises an adjustably positioned annular side-thrust bearing member 21 and a pin type member or journal 22 of small diameter which is secured to the end of the spindle or shaft 16. The pin 22 passes through or is journalled in this annular member and is thus positioned by it. The member 21 is positioned in a recess 23 formed in the end of a plug or support 24. The plug 24 is mounted internally of a hollow bushing 25 which is threaded externally at 26 for engaging a tapped aperture formed in a stationary bracket member 28 positioned at the bottom of the meter frame. The bushing 25 may be adjustably positioned in the bracket 28 for properly locating the bearing member 21 and may be clamped in a given position by any suitable means such as a set screw 30. The bearing member 21 may be composed of any suitable material—as, for instance, a resin-impregnated fabric material sold under the registered trade-mark "Textolite," or other materials commonly used to form the ordinary jewel bearings of a meter.

The upper side-thrust bearing assembly 18 comprises a bearing element 31, which may be similar to the bearing ring 21, and a relatively long flexible pin or journal 32 of small diameter which is secured to a supporting member 34. The bearing element 31 which receives the pin 32 is mounted in a recess 35 formed in the upper end of the shaft. The recesses 23 and 35 may be filled with a lubricant where such operation is desired. The supporting member 34 is provided with a well or recess 36 in order to permit the use of a long pin for giving the desired flexibility, as will be explained more fully hereinafter. The supporting member 34 is supported in an aperture 37 formed in a bracket 38 which is fixed to the upper part of the frame 12. A set screw 39 provides means for adjustably positioning the supporting member 34 with respect to the bracket 38. By making the pin elements 22 and 32 of small diameter the friction forces about the two side-thrust bearings are made to act at a small radius.

Attached to the shaft 16 is a current conducting disk 44 which cooperates with the usual alternating current field producing elements (hidden from view) for producing rotation of the shaft 16 in accordance with the measured quantity. As is well understood, alternating current watthour meters which employ a single driving element, for example, include two alternating current magnets, one excited by the current and the other by the potential of the circuit in which the power is to be measured, each of which induces phase-displaced eddy currents in the meter disk. The disk is driven or caused to rotate by means of the reaction between the field of one magnet and the current induced in the disk by the other magnet of the same driving element. A pair of the usual damping magnets 46, 46 each having an air gap 47 formed between its poles and adapted to receive the disk 44, is provided for setting up a magnetic field to oppose the rotation of the disk 44 in order to make its speed proportional to the power consumption measured by the meter. A suitable registering mechanism 48 having an operating member 50 which is operated from a worm gear portion 51 in accordance with the shaft rotation gives an indication of the energy measured over a period of time.

The action of the eddy currents in the disk 44 and the unidirectional flux from the damping magnets tends to produce a vibratory motion of the disk and shaft members. Fringing of the potential flux in the driving element also causes vibratory motion. Hence, by making the pin type guide member 32 quite flexible any noise produced by this vibration is greatly reduced.

I provide an assembly 52 comprising two permanent magnet elements 54 and 56 for accurately and effectively suspending magnetically the rotary elements including the shaft 16 and the disk 44. As indicated, these magnets are constructed in the form of hollow cylinders and are arranged in telescopic relation with the axes of the cylinders positioned vertically and in alignment with respect to each other. That is, the magnets are disposed in concentric relation or in axial symmetry with one magnet surrounding the other. In the illustrated embodiment the hollow cylindrical magnet 56 is pressed over the end of the shaft 16 and positioned concentrically within the magnet 54. I wish to point out, however, that although the particular arrangement of the magnets as shown in the drawing is preferred because of its simplicity and the ability to use a rotatable magnet of small diameter, the relative location of the fixed and rotatable magnets may be reversed so far as the principle of operation is concerned. Also, other suitable means—as, for instance, cement, may be employed for securing the magnet 56 to the rotatable element. In the illustrated embodiment the hollow cylindrical magnet 54 is secured by a press fit in a suitable non-magnetic shell-like member 58 which is preferably composed of a current-conducting material such as copper or brass and which is screw-threaded at 60 for engaging cooperating threads on the supporting member 34. By means of the set screw 39 the fixed magnet 54 may be adjustably positioned with respect to the upper supporting bracket 38, the lower bracket 26 and the damping magnets 46 in order properly to locate the disk 44 in the air gaps of the damping magnets. However, as an aid in the positioning of the disk 44, threads may be formed on the member 34 and in the aperture 37 of the bracket 38. The magnet 54 and its supporting member 58 may be bevelled as shown at 55 for improving the appearance.

As indicated, the magnets 54 and 56 are each magnetized in the direction of the longitudinal axis of their respective cylinders and in relatively opposite directions with respect to the shaft as an axis, and they are positioned axially relative to each other so that the poles of one magnet are respectively adjacent unlike poles of the other magnet, so that in effect the two magnets form a closed flux path. It may be seen also that the effective zone of the upper pole of the rotating and axially movable magnet 56 floats above the so-called neutral zone of the fixed magnet or the plane at which its polarity may be said to reverse in proceeding from one end of the magnet toward the other. Thus, there is produced an attractive force at each end and a repulsion force between the upper pole of the rotatable magnet and the lower pole of the fixed magnet. Since the poles of the outer magnet 54 are radially displaced by a relatively large amount from the rotary axis with respect to the respective poles of the rotatable magnet with which they cooperate, the fixed magnet is always out of the path of vertical axial movement of the rotatable magnet.

In Fig. 5 I have shown a modified assembly 52a which includes a shield 62 composed of a suitable high permeability magnetic material such as soft iron, for example, which surrounds the magnets 54 and 56. The magnet 54 is supported in a non-metallic cup-like member 58a which conveniently may be composed of a suitable plastic or molded material. The surface of each magnet is shown coated or covered with a suitable shield of current conducting material such as copper plating. If desired, the member 58a may also be made of a current conducting material. Thus any one or all of the features shown in Fig. 5 may be incorporated in the arrangement of Fig. 4. I have shown a pinion 51a connected to the rotary shaft 16 which drives a larger gear 50b, the latter gear being connected to drive the registering mechanism. This type of gear mechanism is particularly suitable in those instances where appreciable torque is required for driving the registering or other mechanism in that it has no tendency to cause the disk 44 to change its position in the air gaps 47 as would the arrangement of Fig. 4 under such circumstances. A suitable magnetic drive, which in itself is well known, may likewise be employed for driving the mechanism from the shaft. This is an important consideration from the standpoint of accuracy in measurement because of the high flux gradient of the high coercive force materials employed in the composition of the damping magnets.

Owing to the limited space availble, the saving in expense made possible by using a standard meter frame, the peculiar conditions encountered in the operation of watthour meters, and other factors which will appear hereinafter, it is important to utilize a material for the permanent magnets 54 and 56 which has a relatively high coercive force and which is relatively insensitive to the temperature variations likely to be encountered. I prefer to employ a magnetic material having a coercive force of at least 800 oersteds and a residual induction of at least 1000 gausses, because a magnetic suspension having such properties may be built of such a size or of such proportions as to be practical in relation to the moving element of a watthour meter. It should be pointed out that, from the standpoint of operability, a successful suspension can be constructed using magnets having a wide range of magnetic properties and below the enumerated values, but as the properties of the magnetic material fall below the foregoing preferred minimum values, the length of the magnets in the suspension system become an increasingly large proportion of the total length of the moving system.

I have found that an alloy comprising as essential ingredients copper, nickel, and cobalt, is highly satisfactory for use in the practice of my invention. Such alloys have been produced having coercive forces ranging from approximately 100 to 950 oersteds and residual inductions ranging from above 1000 to approximately 8000 gausses. A suitable composition for the permanent magnets which I have constructed and tested with highly satisfactory results is approximately 60% copper, 20% nickel, and 20% cobalt. However, a wide variation in percentage is permissible, such, for example, as 50% copper, 25% nickel, and 25% cobalt with one or more other constituents, as will be seen from an inspection of the U. S. Patent No. 2,170,047 to Walter Dannohl and Hans Neumann. When the magnets are composed of an alloy of the first mentioned proportions, their coercive force is approximately 950 oersteds and they have a residual induction of approximately 2100 gausses, and such magnets when properly "aged" before being inserted in the meter are highly resistant to temperature influences. Alloys of the foregoing character need not be given their final form by casting inasmuch as they may be readily machined to the desired dimensions. This adaptability for machining by the use of drills and other cutting tools, as distinguished from a grinding operation, is a great advantage in the instant situation from the standpoint of convenience and important savings in time and expense of manufacture, particularly because of the internal cylindrical openings or apertures of small diameter which must be formed in the magnets.

With regard to the lengths of the respective supporting magnets 54 and 56, maximum supporting efficiency is obtained when both magnets are of substantially the same length. If one magnet is longer than the other the displacement increases for a given incremental change in weight with the result that the system becomes more critical to adjust particularly with respect to the location of the damping disk in the air gaps of the damping magnets.

There have been from time to time several attempts made to provide a magnetic suspension employing permanent magnets for partially or wholly supporting the rotary element of rotating devices such as watthour meters, and which utilized the principle of magnetic attraction, but for one reason or another the arrangements of the prior art have not met with any apparent success, with the result that end-thrust bearings for supporting the shaft are the only accepted standard. This situation is probably explained in large part by the fact that in previous magnetic suspension devices the rotatable element was subject to instability, in some cases in the horizontal plane, and in other cases in the vertical plane. For example, one well known magnetic suspension meter, which was introduced in the early part of the present century and which utilized the principle of magnetic attraction, was stable in the vertical plane but was extremely unstable laterally because as the center soft iron pole pieces on the moving element were allowed to approach the supporting magnets a buildup of pole strength occurred at the narrowest air gap thereby increasing the sidewise forces causing accelerated wear. The effect was a cumulative one because the forces increased with additional wear. The ultimate result of the foregoing process was often a permanent displacement of the rotary element resulting in increased friction forces tending to impede its freedom of movement. Certain conditions peculiar to the operation of watthour meters, and which will be later explained, have also militated against the widespread use of such suspensions.

In operation, the parts are assembled as described and the fixed magnet is adjusted vertically to move the rotatable magnet upward or downward in order properly to position the disk in the gaps of the damping magnets. As the disk is caused to rotate by the driving elements, the rotating system, including the rotary suspension magnet as well as the disk and shaft which it supports, may be said to truly float upon the magnetism of the system, since the rotating system is made entirely free from the influence of gravity so far as vertical components to force are concerned. The telescopic or concentric arrangement of the magnets so that their cooperating poles are spaced transversely or radially a different distance from the axis insures an air gap between the respective cooperating poles under all conditions of vertical load and the system is in equilibrium under all conditions of weight added to the rotatable magnet up to its peak supporting value. When the rotatable magnet has no weight added to it, it occupies a neutral or zero position with its ends substantially in the same horizontal plane with the respective ends of the fixed magnet or a position substantially symmetrical with respect to the fixed magnet. Such a position is unattainable, however, in actual practice due to the weight of the magnet and the small amount of friction about the guide bearings.

As weight is added to the rotatable magnet it tends to move vertically downward until the rate of change in the flux is a maximum for a given incremental change in load. A likely explanation is that although the respective north and south poles of the two magnets recede from each other as the weight is increased, the system nevertheless remains stable within its maximum supporting range because as the rotatable magnet is displaced downward its top pole moves closer to the fixed magnet's lower pole and, this being a like pole combination, there is produced an increasing repulsion force having a vertical component which tends to repel the rotatable magnet upward. I have found that as weight is added to the rotatable magnet there is a substantially linear relationship over a wide range between the lifting or sustaining force and the vertical displacement of the magnet, which relationship holds for the range of weights encountered in watthour meter operation. Thus, while the rotating system may be deflected upward or downward by an abnormal disturbing force, it will restore itself to its original position or again find its own level of flotation and remain suspended in the air without endthrust bearing supports when the abnormal disturbing forces are removed.

It will be appreciated that under any circumstances, the pole faces of the damping magnets, which are spaced apart an amount determined by the desired air gap 47, by engaging the surface of the disk 44 limit the range of vertical movement of the rotating system. In Fig. 3, I have illustrated how this feature is also used to advantage when the meters are arranged in position for shipment. When the magnets are not called upon to support the rotating system, as when the meter base occupies the horizontal position, there is sufficient attractive force to draw the disk 44 against the upper pole faces or to the left as indicated at 66. Thus, vibration and chattering of the parts is prevented. There is a resulting saving in time and expense since it is often customary in preparing conventional meters for shipment to employ a wedge or a spring for holding the disk in a given position.

I wish to point out that the repulsion force due to the like-pole combination also has a horizontal component and, since these like poles come closer together as the rotatable magnet moves downward with respect to the fixed magnet, this component of force tends to increase as the weight is increased, thereby producing radial forces tending to center the rotatable magnet. This centralizing force is, I believe, an important factor in the successful operation of the apparatus embodying my invention. It tends to provide lateral stability with the result that a slight lateral displacement of the suspended element relative to the aligning bearing is not accompanied by a strong sidewise pressure on the bearing. On account of the aforesaid desirable effect which tends to reduce the side thrust, I prefer to float the rotatable magnet in such a position that the zone of its upper pole is near the neutral zone of the fixed magnet.

The arrangement of the two magnets in a closed flux path is a highly efficient and beneficial one. Since the magnetomotive force of each magnet aids that of the other, both ends of each magnet are working to produce a force tending to lift the rotary element, the reluctance of the magnetic circuit is greatly reduced, and the leakage flux is reduced to a minimum with the result that the available magnetic energy of the two magnets is most effectively utilized. Much shorter magnets may be used thereby producing considerable saving in material and contributing in an important manner toward the ability to use a magnetic suspension and guide parts which are mounted within the normal vertical length of the meter shaft so that the dimensions of the meter remain the same. The ability to use a standard meter frame results in a large saving in cost and it makes possible the ready conversion of existing meters already in service to the use of a magnetic suspension element.

Inasmuch as the two magnetomotive forces of the magnets are predominantly aiding each other the device may be made relatively insensitive to slight lateral movement or eccentricity of the small diameter rotatable magnet, because such an arrangement permits the employment of a relatively large annular air grip between the magnets with the result that the rotatable magnet can move an appreciable distance laterally or eccentrically without causing any appreciable change in force tending to decenter it. In other words the moving system is made more able to withstand unbalanced lateral pressures exerted on the rotary element.

The arrangement of the magnets in axial symmetry so that the movable magnet rotates about its polar axis is also an important feature from the standpoint of reducing hysteresis and eddy current effects to a minimum. With the magnets composed of homogenous magnetic material and uniformly magnetized there is always a substantially uniform radial flux relation or magnetic potential existing between the fixed and movable magnets so that hysteresis and eddy currents effects are avoided. Such effects when present produce starting difficulties, as well as a retarding torque on the rotatable element of the meter during operation, and they reduce the efficiency of the suspension element.

There are several important effects in connection with the operation of watthour meters which tend to interfere with the magnets used in suspending the rotary element. As is well known, there is an inherent tendency in permanent magnets to gradually weaken over a period of time. The magnets also tend to weaken due to magnetic disturbances and the effects of temperature variations. Meters installed under practical conditions on electric supply lines to serve central station customers are likely to be subjected to two classes of magnetic disturbances. In the first of these, a short circuit occurs on the load side of the meter (that is, on the customer's side) which may cause a transient current of from one hundred to even one thousand or more times the rated current of the meter to flow through the current coil or coils before the fuses or breakers can interrupt the circuit (depending upon the short circuit capacity of the supply system and the severity of the short circuit.) In the second of these classes of magnetic disturbances, the meter is subjected to a transient overvoltage or current of very short duration, usually because of a surge caused by lightning. These lightning surges may be of all magnitudes up to a value sufficient to burn up the meter or break down the insulation, but many such surges are insufficient to do this and dissipate themselves by causing abnormally large transitory currents in the potential coil of the meter. When either one or a combination of the above two classes of abnormal surges occur, strong magnetic fields are set up around the meter coils and their core structures may become completely saturated, causing strong leakage fields. These transient fields may be of the order of hundreds or even thousands of times the normal value of the leakage fields to which the supporting magnets are ordinarily subjected and, since they are usually produced by alternating current, they are demagnetizing in character.

In my apparatus, however, owing to the properties of the material of which the permanent magnets 54 and 56 are composed and the fact that they are subjected to an alternating current "knockdown" previous to their insertion in the meter, they retain their magnetism with great constancy and watthour meters utilizing my improved magnetic suspension system will retain their high degree of efficiency practically indefinitely. This alternating current "knockdown" which is deliberately given to the magnets by subjecting them to a certain number of demagnetizing ampere-turns makes them much more highly resistant to surges so that the above is true even though a very heavy abnormal field should be produced in the vicinity of the suspension magnets. The knockdown ampere-turns per unit of length provide a measure to a very large extent of the degree of immunity of a given magnet to demagnetizing influences such as surges of the aforementioned character. Magnetic shielding means has been employed heretofore to aid in protecting magnets from the demagnetizing effects of surges but such means only partially guard against the effects of such surges since it is almost impossible to guard completely against a magnetomotive force by a magnetic shield.

Because of the ability to make use of the "knockdown" principle to the necessary degree with the high coercive force materials which I have employed, it has been found unnecessary to employ either a magnetic or a current-conducting shielding means in connection with the arrangement of Fig. 4. In certain cases, however, as for instance when extreme compactness is required so that it becomes necesary to position the suspension magnets close to the operating coils of the meter, it may be desirable to employ a current conducting shield or a magnetic shield or both, as shown in Fig. 5 of the drawing. The magnetic shield gives some protection to the magnets from the effects of steady or uniform external fields including those of low frequency. The copper or current-conducting shield protects the magnets to some extent from high frequency surges and steep wave fronts, such as those due to lightning or switching on power systems.

Watthour meters employing my improved magnetic suspension, as shown in Fig. 4, and having magnets composed essentially of a coper-nickel-cobalt alloy of the relative proportions indicated, have been tested in sound-proof test rooms and their operation compared with that of standard ball and pivot bearing meters. With loads ranging from 200 to 400% of normal loads, the ball and pivot bearing type meter was found to chatter or make a noise which is excited by the guide part of the lower bearing and resonated by the disk due to the ball sliding up and down the radius of the jewel cup. On the other hand, the watthour meters employing the magnetic suspension according to my invention were found to be quiet in operation up to 600% of normal load. Furthermore, during the operation of the meters employing ball and pivot bearings at heavy loads, as the ball tends to crawl up the side of the lower bearing it changes the position of the disk in the air gap of the damping magnets. Due to the high flux gradient or rather the unequal distribution of the flux from the top to the bottom of the gap of such magnets when they are composed of high coercive force materials—as they generally are—this change of position of the disk interferes considerably with the calibration of the meter.

The ordinary watthour meter may be subjected to temperature variations ranging from as low as 60 degrees below zero centigrade to as high as 100 degrees above zero centigrade. I have found from tests conducted on the aforementioned meters that the disk retains substantially the same position in the air gaps of the damping magnets throughout the foregoing temperature range.

I have thus provided an improved magnetic suspension which has demonstrated successfully its ability to withstand the exacting conditions and deleterious influences incident to the operation of watt-hour meters. It is adapted to the suspension of rotary elements of various types of measuring devices. It enables more precise meter registrations or indications to be obtained because the bearing friction is diminished. It further reduces the necessity of frequent inspections with a resulting decrease in maintenance costs.

In the illustrated embodiments I have shown the supporting magnets positioned at the top side of the meter disk in order that they may be spaced as far as possible from the coils of the driving element of the meter and because this is the most convenient position from the standpoint of effective utilization of available space. However, insofar as successful operation—based on the principles of my invention—is concerned, these magnets may be positioned anywhere along the shaft.

I wish to point out also that while I have illustrated my invention for use in connection with a watthour meter of the single phase type, I may likewise practice my invention by employing it in connection with the rotary element of a meter of the polyphase construction in which the meter driving elements operate on either one or a plurality of disks.

In the drawings I have illustrated tubular magnets which are of hollow cylindrical form. However, successful operation may be obtained by making tubular magnets with either the internal surface of the outer magnet or the external surface of the inner magnet which forms the boundary for the air gap between the magnets conforming to the shape of the external surface of a polyangular prism instead of constructing both of these surfaces of cylindrical shape.

In accordance with the provisions of the patent statutes, I have described the principle of operation of my invention together with the apparatus which I now consider to represent the best embodiments thereof but I desire to have it understood that the apparatus shown is merely illustrative and the invention may be carried out by other means.

What I claim as new and desire to secure by Letters Patent of the United States, is:

1. In combination in a magnetic suspension, a tubular permanent magnet magnetized longitudinally of said tube to form poles of unlike polarity at the ends thereof, a vertical shaft to be supported, a second permanent magnet arranged in telescopic and coaxial relation with said tubular magnet, said second magnet being magnetized in the direction of its axis to form spaced poles of unlike polarity, means for supporting one of said magnets, and means for securing the other of said magnets to said shaft with its poles positioned respectively approximately adjacent poles of opposite polarity of said one magnet, said permanent magnets having their polar axes parallel with said shaft so that a vertical force is produced to support said shaft due to the interaction of the magnetic fields of said magnets.

2. In a magnetic suspension, a shaft to be supported and adapted for angular movement about a vertical axis, a first permanent magnet secured coaxially to said shaft for angular movement therewith, said first magnet being polarized in a direction parallel to said shaft, a fixed permanent magnet arranged in concentric relation with respect to said first permanent magnet and being polarized in a direction substantially parallel to said shaft, the polarities of said magnets being relatively opposite and said magnets being of substantially the same length and being arranged with respect to each other in such a way that the upper pole of the first magnet lies above the neutral zone of said fixed magnet, such that said shaft is supported in floating relation by teraction of the magnetic fields of said magnets.

3. In combination in a magnetic suspension, a fixed permanent magnet of cylindrical form polarized in the direction of the longitudinal axis of said cylinder and arranged with said longitudinal axis in a vertical plane, a rotatable permanent magnet constructed in the form of a cylinder and positioned in concentric relation with said fixed permanent magnet, said rotatable permanent magnet being polarized in the direction of its longitudinal axis and the direction of the polarity thereof being relatively opposite to the polarity of said fixed permanent magnet so that the respective poles of one magnet lie substantially adjacent poles of unlike polarity of the other magnet, such that a vertical force is exerted to cause said rotatable magnet to float magnetically with respect to said fixed permanent magnet, and means for guiding the rotation of said rotatable magnet about a vertical axis.

4. In a device of the class described, a supporting member, a rotatable shaft member, means for guiding said rotatable shaft member for rotation in a vertical plane, permanent magnet means comprising a first magnet and a second magnet for magnetically suspending said shaft member from said supporting member, said first magnet being constructed in the form of a hollow cylinder and mounted in axial alignment with said shaft member, said second magnet being of substantially the same length as the first magnet and constructed in the form of a cylinder and concentrically arranged with respect to said first magnet, each of said magnets being polarized in its longitudinal direction, and means for securing one of said magnets to said shaft member for rotation therewith and in such a way that its polarity is relatively opposite in direction to that of the other of said magnets, said magnets being further arranged with respect to each other in such a way that the upper pole of said rotatable magnet lies between the upper pole and the neutral zone of said other magnet whereby said rotatable shaft member is magnetically suspended by the interaction of the fields of said magnets.

5. In combination in a magnetic suspension, a supporting member, a hollow cylindrical magnet secured to said supporting member, said magnet being longitudinally magnetized to form poles of unlike polarity at opposite ends thereof, a shaft to be supported and guided for rotation about the axis of said cylindrical magnet, a second magnet secured to said shaft member and arranged in telescopic and coaxial relation with respect to and within said cylindrical magnet, said second magnet being magnetized along the axis of said shaft and in a direction opposite to that of said cylindrical magnet, said magnets being further arranged so that each pole of one magnet lies approximately adjacent a corresponding pole of opposite polarity of the other magnet such that the weight of said shaft member is supported by magnetic forces of attraction at the ends of said magnet and by magnetic forces of repulsion acting between the upper pole of said rotatable magnet and the lower pole of said cylindrical magnet.

6. A magnetic suspension for a watthour meter of the type having a rotatable shaft guided for rotation above a vertical axis, a current conducting disk mounted on said shaft, and permanent magnet damping means for controlling the rotation of said disk, said magnetic suspension comprising a tubular member magnetized in the direction of the longitudinal axis of said tube to form poles of unlike polarity at its ends, a second member arranged in telescopic and coaxial relation with said tubular member and magnetized in the direction of the common axis of said members to form poles of unlike polarity at its ends, means for supporting one of said members, and means for mounting the other of said members on said shaft for rotation therewith with the neutral zone of said other member below that of said one member and with the poles of said other member lying in close proximity to the poles of opposite polarity of said one member so that the interaction between the fields of said members produces an upward force which supports said shaft and said disk in vertical equilibrium, said members being formed of a machinable alloy comprising as essential ingredients 45–60% copper, 20–30% nickel, and 20–30% cobalt and said alloy having such a temperature-flux characteristic that the position of said disk in the field of said damping magnets is substantially unaffected by temperature variations in the vicinity of said suspension magnets within the temperature range encountered in the operation of said watthour meter.

7. In a magnetic suspension, a rotatable shaft to be suspended for rotation about a vertical axis, first and second lateral guide means for said shaft, said guide means being relatively displaced axially along said shaft, at least one of said guide means being relatively flexible in character to permit lateral displacements of said shaft, first and second cylindrical permanent magnets each being magnetized along its longitudinal axis to form poles of opposite polarity at the ends thereof, the first of said cylinders being constructed to form a longitudinal axial opening therein of greater diameter than the diameter of the second of said cylinders, means for supporting one of said magnets with its longitudinal axis in alignment with the normal axis of rotation of said shaft, means for mounting the other of said magnets in fixed relation to said shaft with its longitudinal axis in alignment with the axis of said shaft, said second magnet being positioned in the longitudinal opening of said first magnet, said rotatable magnet being positioned on said shaft with its neutral axis below the neutral axis of said supported magnet, and said rotatable magnet being further arranged with each of its poles in close proximity respectively to a pole of opposite polarity of said supported magnet, whereby an upward force is produced due to the interaction between said magnets for supporting said shaft.

ALBERT HANSEN, Jr.

CERTIFICATE OF CORRECTION.

Patent No. 2,311,382.  February 16, 1943.

ALBERT HANSEN, JR.

It is hereby certified that error appears in the printed specification of the above numbered patent requiring correction as follows: Page 3, first column, line 68, for "availble" read --available--; and second column, line 32, after "cobalt" insert --, and other combinations of copper-nickel-cobalt--; page 4, first column, line 35, for "to" read --of--; page 5, second column, line 12, for "guard" read --guards--; lines 38 and 39, for "coper-nickel-cobalt" read --copper-nickel-cobalt--; page 6, second column, line 5, for "teraction of the magnetic fields of said magnets" read --the interaction of the fields of said magnets--; and that the said Letters Patent should be read with this correction therein that the same may conform to the record of the case in the Patent Office.

Signed and sealed this 13th day of April, A. D. 1943.

(Seal)

Henry Van Arsdale,
Acting Commissioner of Patents.